(12) United States Patent
Breddermann et al.

(10) Patent No.: US 11,846,722 B2
(45) Date of Patent: Dec. 19, 2023

(54) METHOD AND APPARATUS FOR IMPROVING OBJECT IDENTIFICATION OF A RADAR DEVICE WITH THE AID OF A LIDAR MAP OF THE SURROUNDINGS

(71) Applicant: HELLA GmbH & Co. KGaA, Lippstadt (DE)

(72) Inventors: Tobias Breddermann, Lippstadt (DE); Ridha Farhoud, Laatzen (DE); Tai Fei, Hamm (DE); Christopher Grimm, Lippstadt (DE); Ernst Warsitz, Paderborn (DE)

(73) Assignee: HELLA GmbH & Co. KGaA, Lippstadt (DE)

( * ) Notice: Subject to any disclaimer, the term of this patent is extended or adjusted under 35 U.S.C. 154(b) by 450 days.

(21) Appl. No.: 17/214,288

(22) Filed: Mar. 26, 2021

(65) Prior Publication Data

US 2021/0215794 A1   Jul. 15, 2021

Related U.S. Application Data

(63) Continuation of application No. PCT/EP2019/074966, filed on Sep. 18, 2019.

(30) Foreign Application Priority Data

Sep. 26, 2018   (DE) .................... 10 2018 123 779.0

(51) Int. Cl.
*G01S 7/40* (2006.01)
*G01S 13/86* (2006.01)
(Continued)

(52) U.S. Cl.
CPC .......... *G01S 7/4021* (2013.01); *G01S 7/4052* (2013.01); *G01S 13/865* (2013.01); *G01S 13/89* (2013.01);
(Continued)

(58) Field of Classification Search
None
See application file for complete search history.

(56) References Cited

U.S. PATENT DOCUMENTS

| 10,591,584 B2 | 3/2020 | Bialer et al. |
| 10,592,805 B2 | 3/2020 | Groh et al. |

(Continued)

FOREIGN PATENT DOCUMENTS

| CN | 104508724 A | 4/2015 |
| DE | 102009018311 A1 | 10/2010 |

(Continued)

OTHER PUBLICATIONS

International Search Report dated Dec. 13, 2019 in corresponding application PCT/EP2019/074966.

*Primary Examiner* — Bernarr E Gregory
(74) *Attorney, Agent, or Firm* — Muncy, Geissler, Olds & Lowe, P.C.

(57) ABSTRACT

A method for improving an evaluation of object identification of a radar device of a motor vehicle. A first map is generated of the surroundings of said surroundings by a LiDAR scanner. A first object identification is performed on the basis of the generated first map of the surroundings by a first identification apparatus. A ground-truth model is created of the surroundings on the basis of the performed first object identification by the first identification apparatus. A second map is generated of the surroundings of the surroundings by the radar device. A second object identification is repeatedly performed using alternative object identification algorithms on the basis of the generated second map of the surroundings by a second identification apparatus of the radar device. A radar model is created of the surroundings on the basis of the repeatedly performed second object identification by means of the second identification apparatus.

10 Claims, 4 Drawing Sheets

(51) Int. Cl.
  *G01S 13/89* (2006.01)
  *G01S 13/931* (2020.01)
  *G01S 17/931* (2020.01)
  *G01S 17/89* (2020.01)
  *G01S 13/00* (2006.01)

(52) U.S. Cl.
  CPC ............ *G01S 13/931* (2013.01); *G01S 17/89* (2013.01); *G01S 17/931* (2020.01)

(56) References Cited

U.S. PATENT DOCUMENTS

| | | | |
|---|---|---|---|
| 2007/0182623 A1* | 8/2007 | Zeng | G01S 13/931 342/174 |
| 2008/0300787 A1* | 12/2008 | Zeng | G01S 13/931 701/301 |
| 2017/0124781 A1 | 5/2017 | Douillard et al. | |
| 2017/0169627 A1 | 6/2017 | Kim et al. | |
| 2017/0328729 A1* | 11/2017 | Zhu | G01S 13/931 |
| 2018/0009441 A1 | 1/2018 | Valois | |
| 2018/0025640 A1 | 1/2018 | Micks et al. | |
| 2018/0101720 A1 | 4/2018 | Liu | |
| 2018/0120842 A1 | 5/2018 | Smith et al. | |
| 2019/0164445 A1* | 5/2019 | Guillemette | G01S 7/4021 |

FOREIGN PATENT DOCUMENTS

| | | |
|---|---|---|
| DE | 102013212710 A1 | 11/2014 |
| DE | 102017116192 A1 | 1/2018 |
| DE | 102016216795 A1 | 3/2018 |
| DE | 102017119538 A1 | 3/2018 |
| DE | 102017124756 A1 | 5/2018 |
| DE | 102016225595 A1 | 6/2018 |
| DE | 102017102592 A1 | 8/2018 |

\* cited by examiner

METHOD AND APPARATUS FOR IMPROVING OBJECT IDENTIFICATION OF A RADAR DEVICE WITH THE AID OF A LIDAR MAP OF THE SURROUNDINGS

This nonprovisional application is a continuation of International Application No. PCT/EP2019/074966, which was filed on Sep. 18, 2019 and which claims priority to German Patent Application No. 10 2018 123 779.0, which was filed in Germany on Sep. 26, 2018 and which are both herein incorporated by reference.

BACKGROUND OF THE INVENTION

Field of the Invention

The present invention relates to a method for improving an evaluation of object identification of a radar device of a motor vehicle. The invention also relates to an apparatus for improving an evaluation of object identification of a radar device of a motor vehicle.

Description of the Background Art

Modern motor vehicles have a large number of driver assistance systems. The main task of the driver assistance systems is to support the driver when driving the motor vehicle, for example to relieve him in difficult driving situations, to compensate for deficits in his driving skills and/or to give him the opportunity to concentrate better on particular aspects when driving the motor vehicle. Driver assistance systems can essentially be divided into purely informative driver assistance systems and automatically intervening driver assistance systems.

A purely informative driver assistance system has the task of notifying the driver of an event. Classic examples for purely informational driver assistance systems are lane assist and curve assist. These driver assistance systems analyze a driving situation and warn the driver in the event of a potential danger. For example, when driving over a lane marking without a corresponding turn signal, the driver is made aware of this by an acoustic signal or a haptic signal, in particular a vibration of the steering wheel. However, it is up to the driver to correct the direction of travel. At the same time, lane assists or curve assists are also known which automatically make a corresponding correction. Such driver assistance systems then count among the automatically intervening driver assistance systems.

Known automatically intervening driver assistance systems are, for example, the brake assist, parking assist and high-beam assist. These driver assistance systems analyze a driving situation and, if necessary, actively intervene in the control of the motor vehicle. The high-beam assistant automatically switches the high beam off, for example, in case there is danger of blinding other road users, the brake assist brakes the motor vehicle in order to avoid a possible collision, in particular with another road user, and the parking assist steers the motor vehicle into a parking space. In addition, automatically intervening driver assistance systems mostly have a signal function in order to make the driver aware of the automatic intervention by the driver assistance system.

A special case of a driver assistance system is autonomous driving. While the driver assistance systems described above merely assist the driver, autonomous driver assistance systems are able to control the motor vehicle independently. The driver only has to specify a route or a destination, and the task of monitoring the autonomous driver assistance system.

For proper functioning, driver assistance systems have apparatuses for detecting different parameters, such as vehicle speed, lane markings, road users or the like, for example. In this context, for example, radar devices are used in motor vehicles in order to identify objects in the surroundings of the motor vehicle and to report them to one or more driver assistance systems. The quality of this object identification must be ensured in every driving situation. In addition, there are legal regulations that require quality certification for radar devices. Accordingly, the quality of the object identification and the corresponding documentation of the quality are of great importance in the development process for radar devices.

A method for simulating sensor measurements is known from DE 10 2013 212 710 A1. In this context, a modular, reusable sensor model of a sensor is created, which describes the properties of a sensor. Virtual sensor measurements of the sensor can be carried out by means of the sensor model. In this way, interfaces are to be created between different areas of development in order to facilitate the development of driver assistance systems. DE 10 2016 225 595 A1 describes a method and an arrangement for calibrating sensors of rail vehicles using certain reference objects which can be detected by the sensors. The sensors are calibrated by comparing the measurement results of the sensors and the expected measurement results.

These known apparatuses and methods have the disadvantage that the quality of object identification of the sensor, in particular of a radar device, can only be determined with great effort. This leads to increasing development times and high development costs for radar devices. In addition, there is often a lack of objective criteria for determining the quality of the object identification of the radar device, which makes it even more difficult to optimize quality.

SUMMARY OF THE INVENTION

It is therefore an object of the present invention to provide a method and an apparatus for improving an evaluation of object identification of a radar device of a motor vehicle. In particular, it is an object of the present invention to provide a method and an apparatus for improving an evaluation of object identification of a radar device of a motor vehicle, which ensures automated determination of the quality of the object identification in a simple and inexpensive manner and thus contributes to the decrease in development times and/or development costs for radar devices.

Accordingly, the object is achieved by a method for improving an evaluation of object identification of a radar device of a motor vehicle and by an apparatus for improving an evaluation of object identification of a radar device of a motor vehicle. Thereby, features and details that are described in connection with the inventive method clearly also apply in connection with the inventive apparatus and vice versa, so that with respect to the disclosure of the individual aspects of the invention, they are or can always be referred to reciprocally.

In an exemplary embodiment, the object is also achieved by a method for improving an evaluation of object identification of a radar device of a motor vehicle. The method includes the following steps: generating a first map of the surroundings using a LiDAR scanner, performing a first object identification on the basis of the generated first map of the surroundings by means of a first identification apparatus, creating a ground-truth model of the surroundings on the basis of the performed first object identification by means of the first identification apparatus, generating a second map of the surroundings by means of the radar device, repeatedly performing a second object identification with alternative object identification algorithms on the basis of the generated second map of the surroundings by means of a second identification apparatus of the radar device, respectively creating a radar model of the surroundings on the basis of the repeatedly performed second object identification by means of the second identification apparatus, repeatedly determining object identification algorithm-specific quality functions of the radar device on the basis of a deviation of the radar models of the surroundings from the ground-truth model of the surroundings by means of a determination apparatus, and identifying a suitable object identification algorithm on the basis of a level of the quality function by means of the determination apparatus.

The quality of the object identification is a measure of how precisely or how reliably the object identification of the radar device operates. The higher the quality of the object identification, the more reliably objects are identified by the radar device.

First, the first map of the surroundings of said surroundings is generated using a so-called LiDAR scanner. "LiDAR" stands for "Light Detection And Ranging" and is a method in which laser beams are used to scan the environment. For this purpose, laser beams or laser pulses are emitted and the laser light reflected back from objects is detected. Based on the known direction when the laser beams are emitted and the length of time between emission and detection of the laser beams, relative distances to the objects reflecting back and relative speeds of the objects can be determined. The LiDAR scanner has a particularly high resolution, so that the first map of the surroundings is advantageously generated with a high resolution, at least with a more precise resolution than a radar device.

In this context, a map of the surroundings can be understood to be the geometric mapping of the surroundings of the motor vehicle. In addition to this, to support radar parameterization, detailed and dedicated speed information of the surroundings can be/is extracted from the geometric LiDAR map of the surroundings via observation over time, described in "optical flow".

On the basis of the first map of the surroundings, the first object identification takes place by means of the first identification apparatus. During the first object identification, objects that are present in the first map of the surroundings are identified. In this context, street signs, motor vehicles, people, strollers, bicycles or the like can be identified, for example.

The ground-truth model of the surroundings is created from the objects identified by the first object identification. The ground-truth model of the surroundings can, for example, contain all the information from the first map of the surroundings, wherein the individual objects are identified in the ground-truth model of the surroundings. Alternatively, unimportant information from the first map of the surroundings, such as very small objects, grass or the like, can be masked out of the ground-truth model of the surroundings. The ground-truth model of the surroundings serves as a reference model for determining the quality of the object identification of the radar device.

The second map of the surroundings is generated by means of the radar device. For physical reasons, the radar device usually has a significantly lower resolution than the LiDAR scanner, so that the second map of the surroundings inherently has a lower resolution than the first map of the surroundings.

On the basis of the generated second map of the surroundings as well as the optional extracted speed information, subsequently the second object identification is repeatedly performed by the second identification apparatus of the radar device with different object identification algorithms. In the context of the invention, the second object identification is understood to mean the identification of objects on the second map of the surroundings. As a result of this method step, each of the various object identification algorithms are assigned at least one identification of objects. The more frequently this method step is repeated, the more second object identifications and object identification algorithms assignments are generated.

A radar model of the surroundings is respectively created from the second object identification by means of the second identification apparatus. This means, for example, that if n object identification algorithms are used, n object identification algorithm-specific radar models of the surroundings are also created. The radar model of the surroundings can, for example, contain all information from the second map of the surroundings, wherein the individual objects are identified in the radar model of the surroundings. Alternatively, unimportant information from the second map of the surroundings, such as very small objects, grass, noise, interference caused by external radar devices or the like, can be masked out of the radar model of the surroundings.

The radar models of the surroundings created in this way are compared with the ground-truth environment model by means of the determination apparatus. The result of this comparison is a difference between the ground-truth model of the surroundings and the individual radar models of the surroundings. This difference is reciprocal to the quality functions of the respective object identification algorithm of the radar device.

Hence, in a following method step, a suitable object identification algorithm is identified based on the level of its quality function. Here, preferably the rule applies that an object identification algorithm with a high quality function is to be preferred to an object identification algorithm with a lower quality function. Thus, an object identification algorithm is preferably selected whose radar model of the surroundings has the smallest difference to the ground-truth model of the surroundings. Ideally, in this way, the object identification algorithm with the highest quality function is identified and selected for the operation of the radar device.

A method according to the invention for improving an evaluation of object identification of a radar device of a motor vehicle offers the advantage over the conventional method that, with simple means and in a cost effective manner, an object identification algorithm of the radar device is identified which ensures particularly reliable object identification.

It can be provided in a method that virtual radar data are generated from the ground-truth model of the surroundings by means of the determination apparatus and using system parameters of the radar device, wherein the virtual radar data for tuning the radar device are used to generate the second map of the surroundings. The virtual radar data can be used to tune the radar device using elementary system parameters of the radar device, such as, for example, bandwidth, sampling rate, sampling type, center frequency or the like. This offers the advantage that, in order to improve the evaluation of the object identification, operation of the radar device can be simulated or imitated with simple means and in a cost-effective manner.

It is further preferred according to the invention that the virtual radar data are artificially generated by means of a generative statistical model, in particular simGAN, prior to tuning with the radar device. The generative statistical model enables statistical properties of radar data from real radar devices to be imitated reliably and cost-effectively. It is not necessary to actually use these radar devices. This can further reduce development costs and development times for radar devices.

More preferably, when artificially generating the virtual radar data by means of the generative statistical model, variations are impressed in the virtual radar data which map statistical noise effects. In this way, a particularly realistic simulation of the radar device is achieved with simple means and inexpensively, which takes special properties of the radar device into account. This allows for development costs and development times for radar devices to be further reduced.

In a particularly preferred refinement of the method, when the virtual radar data are artificially generated by means of the generative statistical model, variations are impressed on the virtual radar data, which represent variations of a driving scenario of a motor vehicle. In this way, with simple means and inexpensively, a particularly realistic simulation of the radar device is achieved, which takes different driving scenarios into account. It is therefore not necessary to actually use the radar device in an identical driving scenario to create the second map of the surroundings. As a result, development costs and development times for radar devices can be further reduced.

The first map of the surroundings and the second map of the surroundings are preferably generated from a moving motor vehicle. Accordingly, the LiDAR scanner and the radar device are preferably arranged on the motor vehicle. Generating said maps of the surroundings using a moving motor vehicle offers the advantage that a particularly large amount of data can be produced in a short time, by means of which the object identification algorithm of the radar device can be identified with the highest quality function. This can further improve the efficiency of the method.

A second map of the surroundings of the surroundings by means of the radar device is repeatedly generated with variable radar parameters, wherein the repeated performing of the second object identification, the creating of radar models of the surroundings, the repeated determining of the quality functions and the identifying of the suitable object identification algorithm is performed on the basis of the level of the quality function for the generated maps of the surroundings. By varying the radar parameters, such as scanning type, scanning rate, bandwidth, center frequency and the like, different second maps of the surroundings can be generated. In this way, with simple means and inexpensively, the radar parameters and object identification algorithms of the radar device can be identified, which have a particularly high quality function and are therefore particularly suitable for operating the radar device.

The object is achieved by an apparatus for improving an evaluation of object identification of a radar device of a motor vehicle. The apparatus has a radar device for generating a second map of the surroundings of said surroundings, wherein the radar device has a second identification apparatus for performing object identification with alternative object identification algorithms on the basis of the generated second map of the surroundings. According to the invention, the apparatus has a LiDAR scanner for generating a first map of the surroundings, a first identification apparatus for performing a first object identification on the basis of the generated first map of the surroundings and a determination apparatus for determining object identification algorithm-specific quality functions of the radar device and for identifying a suitable object identification algorithm on the basis of a level of the quality function, in particular an object identification algorithm with the highest quality function.

In the described apparatus for improving an evaluation of object identification of a radar device of a motor vehicle, all of the benefits are obtained that have already been described with respect to a method for improving an evaluation of object identification of a radar device of a motor vehicle, pursuant to the first aspect of the invention. Accordingly, the apparatus according to the invention offers the advantage over known apparatuses that an object identification algorithm of the radar device, which ensures particularly reliable object identification, can be identified with simple means and in a cost-effective manner.

The apparatus can be designed to perform a method according to the invention. This offers the advantage that an object identification algorithm of the radar device, which ensures particularly reliable object identification, can be identified with simple means and in a cost-effective manner.

The apparatus can be arranged on a motor vehicle. Arranging the apparatus on a moving motor vehicle offers the advantage that in this way a particularly large amount of data can be produced in a short time, by means of which the object identification algorithm of the radar device with the highest quality function can be identified particularly reliably. In this way, the efficiency of the apparatus according to the invention can be further improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
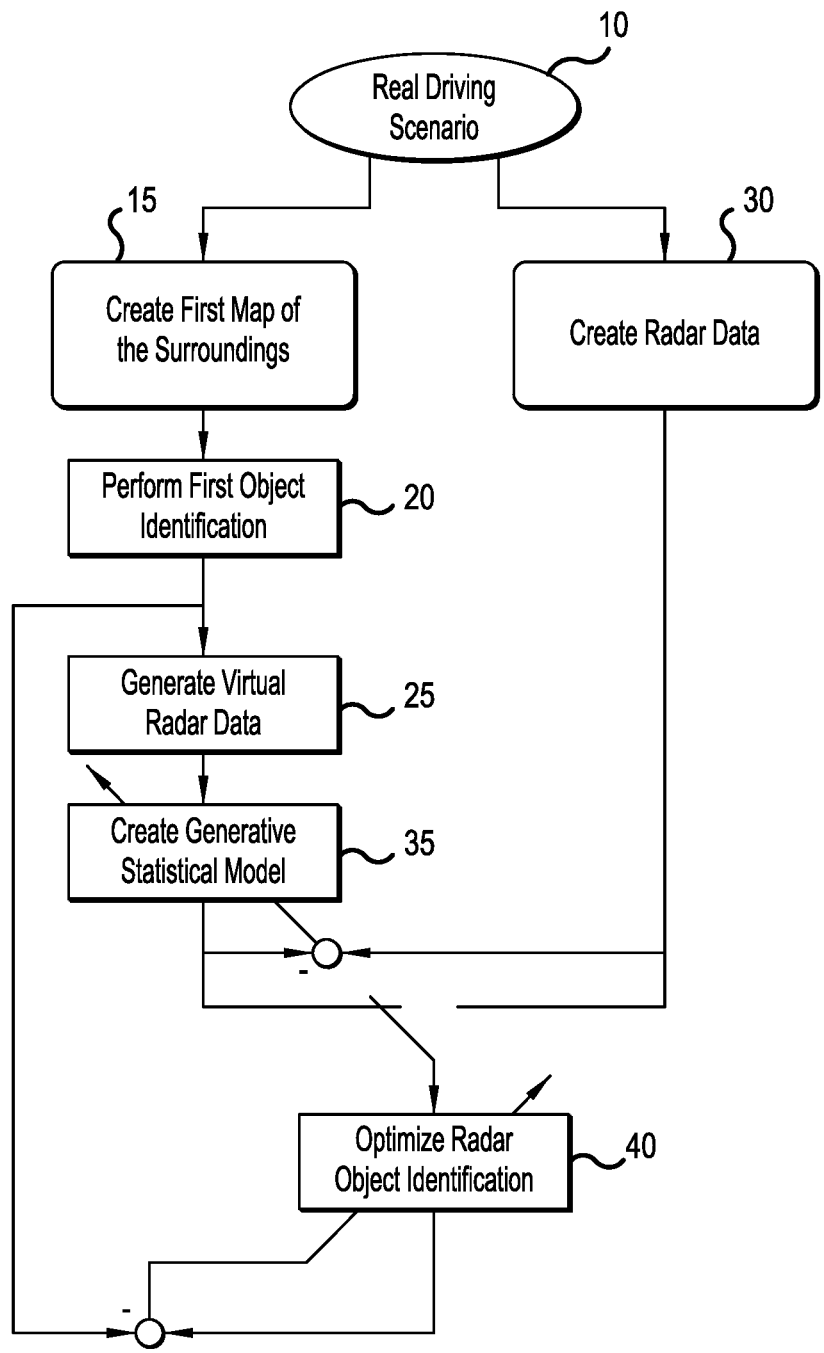
FIG. 1 shows a diagram of a preferred signal flow of the method according to the invention.
Figure 2:
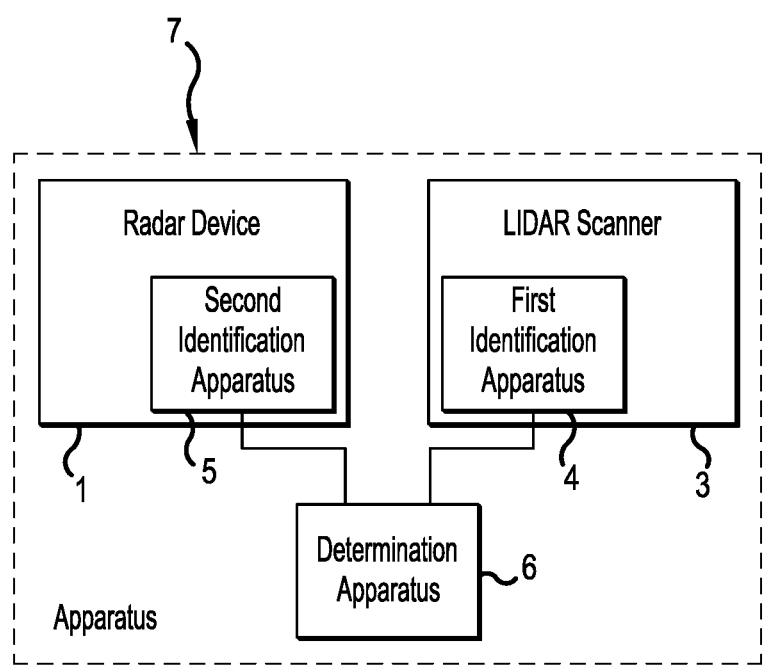
FIG. 2 shows a schematic structure of a preferred embodiment of the apparatus according to the invention.

FIG. 1 schematically shows a diagram of a preferred signal flow of the method according to the invention. The apparatus 7 used to perform the method is shown schematically in FIG. 2 based on a real driving scenario 10, the real driving scenario 10 is scanned by means of a LiDAR scanner 3. A first map of the surroundings 15 is then created by means of the LiDAR scanner 3. By means of a first identification apparatus 4 of the LiDAR scanner 3, a first object identification 20 is performed and virtual radar data 25 are generated.

Also on the basis of the real driving scenario 10, the real driving scenario 10 is scanned by means of a radar device 1. Subsequently, radar data 30 are created by means of the radar device 1. This may include, for example, generating a second map of the surroundings, performing a second object identification by means of a second identification apparatus 5 of the radar device 1 as well as creating a radar model of the surroundings by means of the second identification apparatus 5. Based on this, and taking into account the creation of the radar data 30, the generative statistical model 35 is created. This is used to optimize the radar object identification 40 by means of a determination apparatus 6 of the apparatus 1.

Figure 3:
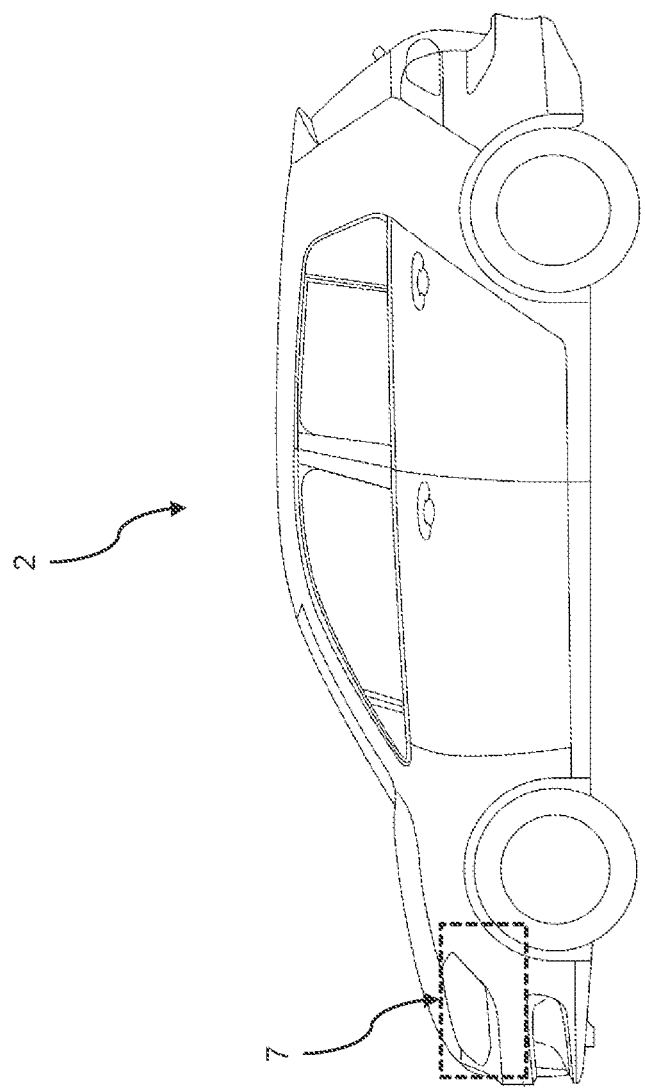
FIG. 3 shows a side view of a motor vehicle with an apparatus according to the invention.

FIG. 3 schematically shows a motor vehicle 2 with an apparatus 7 according to the invention in a side view. The apparatus is arranged in a front area of the motor vehicle, in particular in the area of a radiator grill, wherein the radar device 1 and the LiDAR scanner are preferably oriented in the direction of travel of the motor vehicle 2. According to the invention, it can be provided that the apparatus has a plurality of LiDAR scanners 3 and/or radar devices 1, wherein a LiDAR scanner 3 and/or a radar device 1 are arranged, for example, on a side and/or on a rear area of the motor vehicle 2.

Figure 4:
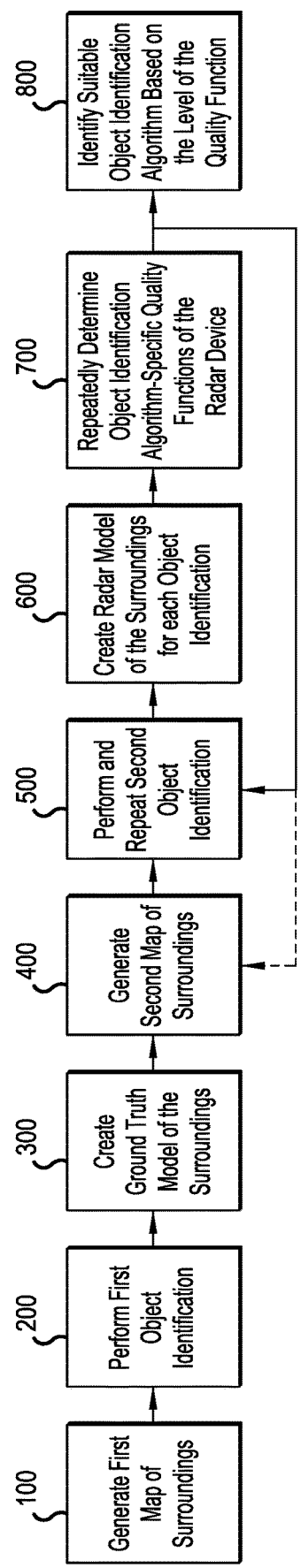
FIG. 4 shows a flowchart of a preferred embodiment of the method according to the invention.

FIG. 4 schematically shows a flow chart of the preferred embodiment of the method according to the invention. In a first method step 100, a first map of the surroundings of said surroundings is generated by means of a LiDAR scanner 3. In a second method step 200, a first object identification is performed on the basis of the generated first map of the surroundings by means of a first identification apparatus 4. In a third method step 300, a ground-truth model of the surroundings is created on the basis of the first object identification performed by means of the first identification apparatus 4. In a fourth method step 400, a second map of the surroundings of said surroundings is generated by means of the radar device 1. In a fifth method step 500, a second object identification is repeated using alternative object identification algorithms on the basis of the generated second map of the surroundings by means of a second identification apparatus 5 of the radar device 1. In a sixth method step 600, in each case a radar model of the surroundings is created for each object identification by means of the second identification apparatus 5. In a seventh method step 700, the determination apparatus is used to repeatedly determine object identification algorithm-specific quality functions of the radar device 1 on the basis of the deviation of the radar model of the surroundings from the ground-truth model of the surroundings. In an eighth method step 800, the determination apparatus 6 is used to identify a suitable object identification algorithm based on the level of the quality function. In this case, the object identification algorithm with the highest quality function is preferably identified and selected for the operation of the radar device 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for improving an evaluation of object identification of a radar device of a motor vehicle, the method comprising:
    generating a first map of the surroundings of the surroundings via a LiDAR scanner;
    performing a first object identification on based on the generated first map of the surroundings via a first identification apparatus;
    creating a ground-truth model of the surroundings based on the performed first object identification via the first identification apparatus;
    generating a second map of the surroundings of the surroundings via the radar device;
    repeatedly performing a second object identification using alternative object identification algorithms based on the generated second map of the surroundings via a second identification apparatus of the radar device;
    creating a radar model of the surroundings based on the repeatedly performed second object identification via the second identification apparatus;
    repeatedly determining object identification algorithm-specific quality functions of the radar device based on a deviation of the radar model of the surroundings from the ground-truth model of the surroundings via a determination apparatus; and
    identifying a suitable object identification algorithm based on a level of the quality function via the determination apparatus.

2. The method according to claim 1, wherein virtual radar data are generated from the ground-truth model of the surroundings via the determination apparatus and using system parameters of the radar device, and wherein the virtual radar data for tuning the radar device are used to generate the second map of the surroundings.

3. The method according to claim 2, wherein the virtual radar data are generated via a generative statistical model prior to tuning with the radar device.

4. The method according to claim 3, wherein, when artificially generating the virtual radar data via the generative statistical model, variations are impressed in the virtual radar data, which represent statistical noise effects.

5. The method according to claim 3, wherein, when artificially generating the virtual radar data via the generative statistical model, variations are impressed in the virtual radar data, which map variations of a driving scenario of a motor vehicle.

6. The method according to claim 1, wherein at least the generation of the first map of the surroundings and the generation of the second map of the surroundings are performed from a moving motor vehicle.

7. The method according to claim 1, wherein a second map of the surroundings of said surroundings is repeatedly generated by means of the radar device with changeable radar parameters, wherein the repeated performing of the second object identification, the creating of the radar models of the surroundings, the repeated determining of the quality functions as well as the identifying of the suitable object identification algorithm are performed based on the level of the quality function for the generated map of the surroundings.

8. An apparatus for improving an evaluation of object identification of a radar device of a motor vehicle, the apparatus comprising:
    a radar device to generate a second map of the surroundings of the surroundings, the radar device having a second identification apparatus to perform object identification with alternative object identification algorithms based on the generated second map of the surroundings;
a LiDAR scanner to generate a first map of the surroundings of the surroundings;
a first identification apparatus to perform a first object identification based on the generated first map of the surroundings; and
a determination apparatus to determine object identification algorithm-specific quality functions of the radar device and to identify a suitable object identification algorithm based on the level of the quality function.

9. The apparatus according to claim 8, wherein the apparatus is designed to perform a method comprising:
generating a first map of the surroundings of the surroundings via a LiDAR scanner;
performing a first object identification on based on the generated first map of the surroundings via a first identification apparatus;
creating a ground-truth model of the surroundings based on the performed first object identification via the first identification apparatus;
generating a second map of the surroundings of the surroundings via the radar device;
repeatedly performing a second object identification using alternative object identification algorithms based on the generated second map of the surroundings via a second identification apparatus of the radar device;
creating a radar model of the surroundings based on the repeatedly performed second object identification via the second identification apparatus;
repeatedly determining object identification algorithm-specific quality functions of the radar device based on a deviation of the radar model of the surroundings from the ground-truth model of the surroundings via a determination apparatus; and
identifying a suitable object identification algorithm based on a level of the quality function via the determination apparatus.

10. The apparatus according to claim 8, wherein the apparatus is arranged in a motor vehicle.

* * * * *